(12) United States Patent
Cronin et al.

(10) Patent No.: US 6,408,587 B2
(45) Date of Patent: Jun. 25, 2002

(54) STRUCTURAL MEMBERS AND ASSOCIATED PARTS

(75) Inventors: Christopher Patrick Noel Cronin, Severnstoke; Neil Howard Darracott, Rugby, both of (GB)

(73) Assignee: Total Fabrications Limited (GB)

( * ) Notice: Subject to any disclaimer, the term of this patent is extended or adjusted under 35 U.S.C. 154(b) by 0 days.

(21) Appl. No.: 09/746,586

(22) Filed: Dec. 21, 2000

(30) Foreign Application Priority Data

Dec. 24, 1999 (GB) ............................................. 9930628
Sep. 9, 2000 (GB) ............................................. 0022152
Sep. 9, 2000 (GB) ............................................. 0022154

(51) Int. Cl.$^7$ ................................................ E04B 1/00
(52) U.S. Cl. ...................... 52/637; 52/651.01; 52/651.1; 52/655.1; 52/730.4; 52/690; 52/693; 52/695; 52/726.1; 52/726.2; 403/381; 403/345; 403/364; 403/286; 403/292; 403/294; 182/178.1; 182/178.2; 182/178.3; 182/186.7
(58) Field of Search ................ 52/637, 651.01, 52/651.1, 655.1, 730.4, 690, 693, 695, 726.1, 726.2; 403/381, 345, 364, 286, 292, 294; 182/186.7, 178.1, 178.2, 178.3, 178.5

(56) References Cited

U.S. PATENT DOCUMENTS 3,885,647 A  5/1975 Acosta ........................... 182/8
4,130,177 A  12/1978 Pandolph
4,269,284 A  5/1981 Swager
5,156,233 A  10/1992 Olsen et al. .................... 182/3
5,711,131 A  * 1/1998 Thomas ...................... 52/656.9
5,993,100 A  * 11/1999 Gastman ...................... 403/292

FOREIGN PATENT DOCUMENTS

| DE | 37 28 282 A1 | 2/1988 | |
|---|---|---|---|
| EP | 0 168 021 | 9/1985 | |
| EP | 0593150 A2 | 4/1994 | |
| EP | 0 681 064 A2 | 4/1995 | |
| FR | 2 330 824 | 11/1975 | |
| GB | 2070185 A | 9/1981 | |
| GB | 2226071 A | 6/1990 | |
| GB | 2278627 | * 7/1994 | ........... E04G/21/32 |
| GB | 2278627 A | 12/1994 | |
| WO | WO 94/04786 | 3/1994 | |

* cited by examiner

Primary Examiner—Carl D. Friedman
Assistant Examiner—Christy Green
(74) Attorney, Agent, or Firm—Marshall, Gerstein & Borun

(57) ABSTRACT

A structural member, e.g. a truss for erection of temporary structures, comprises a number of elongate elements disposed in spaced generally parallel relationship to one another with transversely extending elements therebetween, and an element extending longitudinally of the structural member has a formation extending lengthwise of it for engagement by an attachment member which is to be retained to the longitudinally extending element at any of a range of positions therealong. The attachment member may provide for connection of a safety element to the structural member, and be freely movable therealong in use.

21 Claims, 11 Drawing Sheets

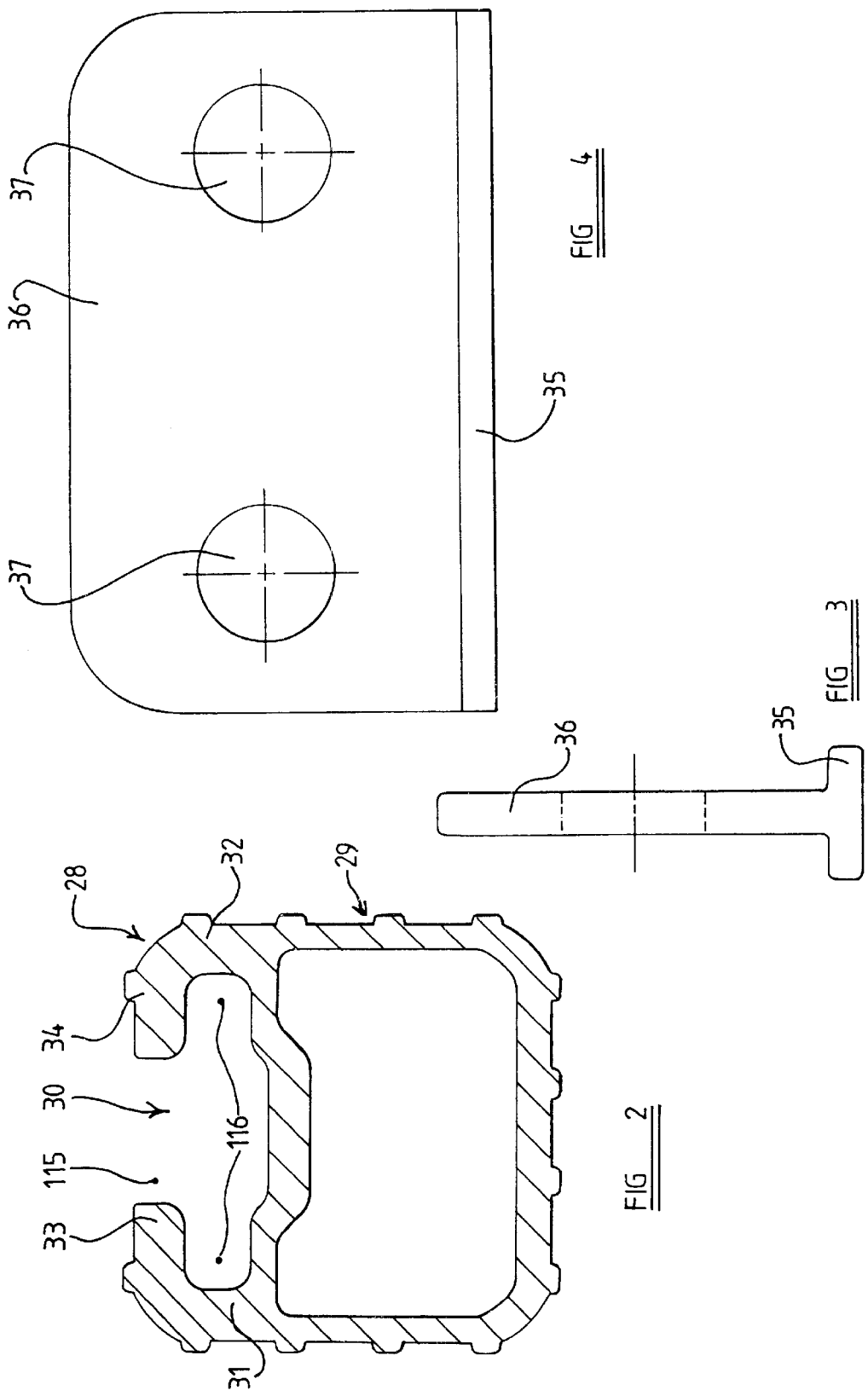

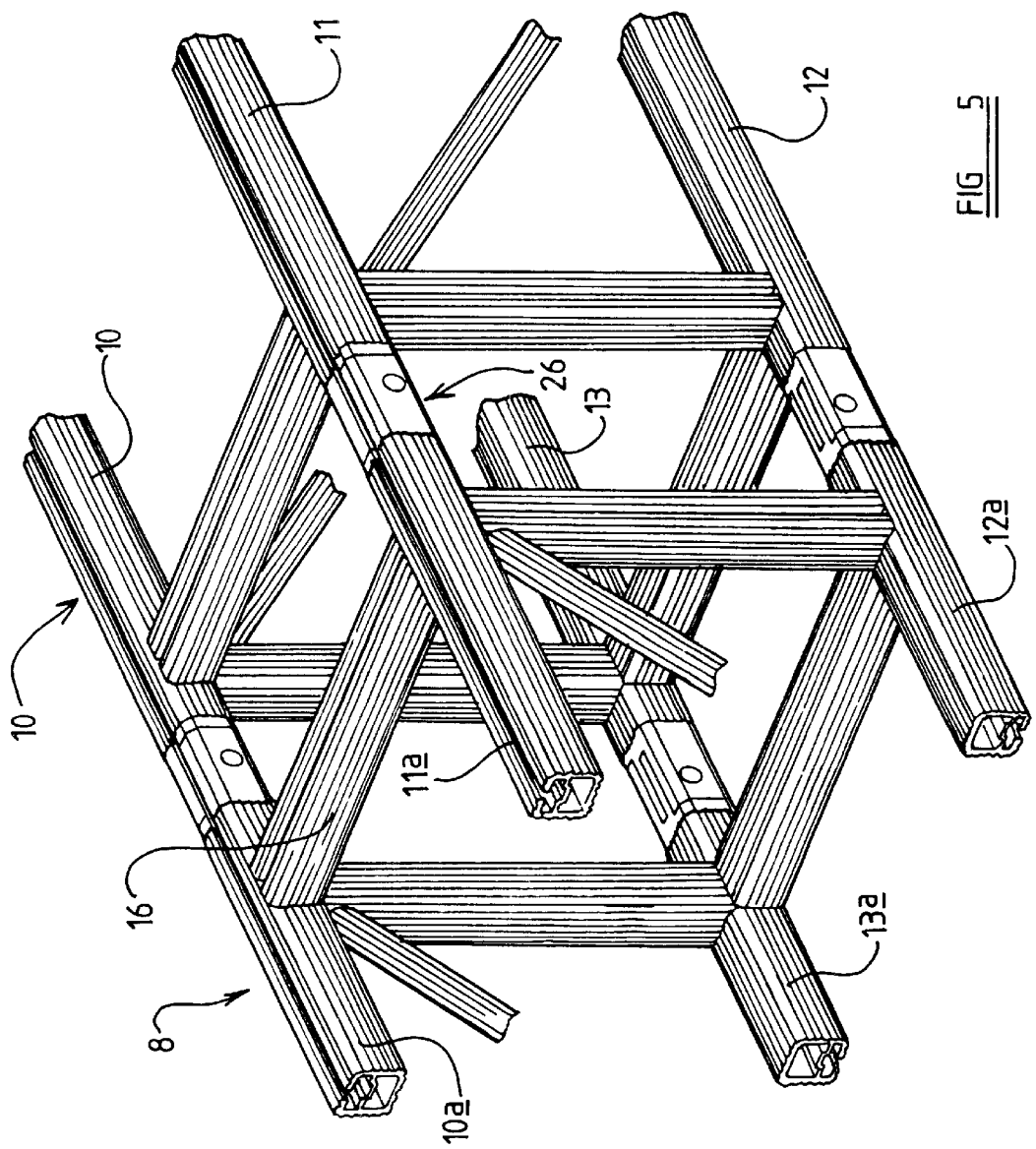
FIG_5

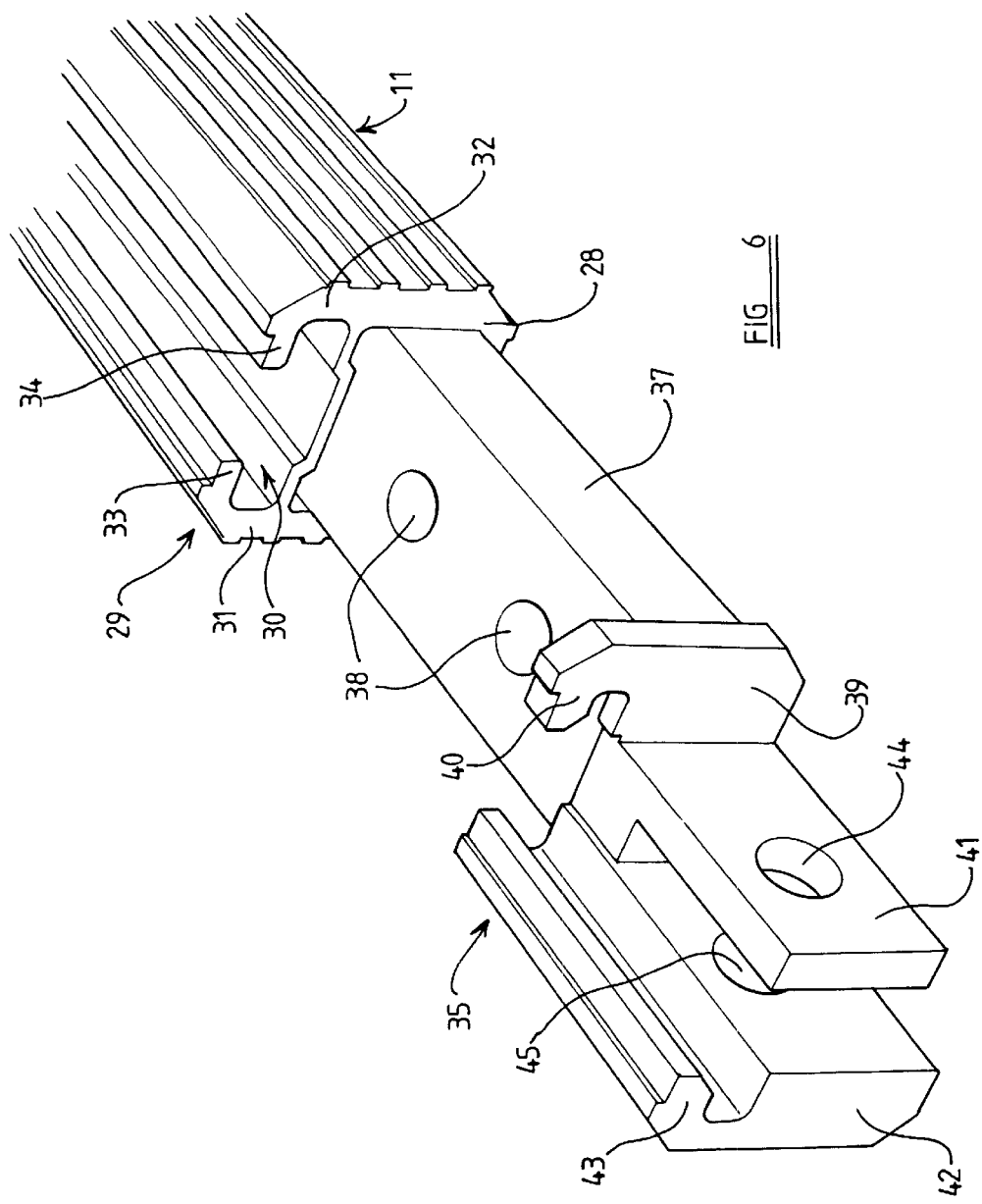

STRUCTURAL MEMBERS AND ASSOCIATED PARTS

BACKGROUND OF THE INVENTION

Field of the Invention

This invention relates to structural members and to parts and fitting used and for use in association therewith.

Structural members to which the invention relates may be used for the construction of permanent or temporary structures for use in what may broadly be regarded as the entertainment industry. By way of example but not limitation, such structures may be used in association with a stage for the presentation of a musical/theatrical event, for the support of a roof over a stage, for carrying lighting, sound, scenery or other production equipment, or indeed anything that may be required. In many cases such structures are temporary if an event is taking place for a short period of time, but such a structure may well be permanently installed at a location. A further example of a situation in which structural members in accordance with the invention may be utilised is an exhibition stand, but in its broadest aspect structural members in accordance with the invention may be used wherever a requirement arises therefor.

A basic element from which such structures may be assembled is a "truss", and more particularly a structural member in accordance with the invention may be such a truss. A truss characteristically comprises a number of elongate elements secured in spaced generally parallel relationship to one another by a number of transversely extending elements therebetween. The transversely extending elements are arranged to ensure that the truss is adequately strong and rigid for the loads it is intended to bear: typically some transversely extending elements extend perpendicularly to the elongate elements while other extend diagonally therebetween. Trusses particularly described hereafter are generally rectangular in transverse cross-sectional shape, with principal elongate elements at the corners of the rectangle, but generally trusses may be of other cross-sectional shapes, e.g. polygonal with more or less than four principal elongate elements. For special purposes, some trusses are able to be folded flat to occupy a minimal space for storage or transportation, and erected to an operative cross-sectional shape when required to be used. Generally, there are many known configurations of truss and the invention is applicable throughout the range of such configurations.

A structure may be created by joining a plurality of trusses together in the required configuration, using suitable connectors and fastenings as described hereafter. A structure may incorporate parts at a substantial height above a floor or ground level, and persons assembling the structure have to work at such heights. After the structure has been completed, further work will be necessary to mount other items such as lighting equipment thereon. Whilst theoretically separate access equipment should be used for safe working at a height, in practice the structure itself may be climbed upon and this brings obvious dangers in case of a fall. With this in view, a person may attach himself to a safety line which is clipped to a truss in the region in which work is taking place, but this inhibits freedom of movement and if a fall occurs may impose loads on the structure which could damage it. Add-on fall-arrest systems have been proposed, but these may interfere with the structure, imposing undue loads thereon, and generally are inconvenient.

SUMMARY OF THE INVENTION

It is broadly the object of one aspect of the present invention to address the above described problem of assisting safety of persons working at a height on a structure as above described.

According to one aspect of the invention, therefore, we provide a structural member comprising a number of elongate elements disposed in spaced generally parallel relationship to one another with transversely extending elements therebetween, wherein an element extending longitudinally of the structural member is provided with a formation extending lengthwise thereof for engagement by an attachment member to be retained to the longitudinally extending element at any of a range of positions therealong.

The attachment member may be adapted for connection to a safety element. Then it may be engaged with the formation of the elongate element in such a way as to be freely movable therealong.

Alternatively the attachment member may provide for the support of lighting or sound equipment for example to the structural member and may be intended, when engaged with the elongate element at a required position, to remain in such position.

The structural member may be generally of polygonal shape in cross-section, and some or all of the elongate elements may be disposed at the corners of such a polygonal shape. It may be at least one of said elongate elements which is provided with a respective said lengthwise-extending formation. Preferably all of said elongate elements constituting the structural member are of the same cross-sectional shape as one another, and thus each has a said formation.

The cross-sectional shape of the elements 10–13, clearly seen in FIG. 2, comprises a hollow generally rectangular box-section portion 28 and a portion 29 which defines an undercut generally T-section track formation 30 (the T-section track formation 30 shown inverted in FIG. 2). The portion 29 comprises side walls portions 31, 32 which extend generally parallel to one another from adjacent edges of the portion 28, the wall portions 31, 32 ending at inwardly-facing lip portions 33, 34 which extend towards one another to define an opening 115 therebetween. Oppositely outwardly extending recesses 116 are afforded beneath the lip portions 33, 34. The outwardly extending recesses 116 cooperate to form the cross-member of the "T" (which as states above is inverted in FIG. 2). Lengthwise external ribbing on the elements 10–13 is visible in FIGS. 2, 4, and 5, but omitted from FIG. 6 for clarity. Such external ribbing renders the element easier to grip and handle, to facilitate its use in erection of a structure.

Conveniently each of said elongate elements is an extrusion of an appropriate aluminium alloy. However, other materials may be suitable and it is contemplated that possibly a plastics material, e.g. fibre-reinforced, may be usable. Apart from a portion thereof having the lengthwise extending track formation, the or each elongate element may comprise a portion which is hollow, and which may be of generally square or rectangular transverse cross-sectional shape.

According to a further aspect of the invention, we provide a structure comprising at least one structural member in accordance with the first aspect of the invention as above set forth. The invention yet further provides such a structure having one or more attachment members engaged with one or more of said track formations thereof. Yet further, a safety device such as a safety lanyard may be connected to at least one of said attachment members.

Whether an attachment member is intended for connecting something to a track formation as above described at a fixed point along its length, or whether an attachment member for a safety element is movable along the track formation, engagement of such an attachment member with the track has in many cases hitherto required passing thereof lengthwise into the track from an end thereof. Similarly the attachment member has only been able to be disengaged from the track at an end thereof. Whilst this provides a high degree of safety in respect of the security with which the attachment member is held captive when it is in, for example, a mid-position along the track, it would in many cases be convenient if it were to be engageable with and disengageable from the track at such a mid-position. At the same time as providing this convenient ability, however, there should be a high degree of security against an intentional disengagement from the track.

It is broadly the object of another aspect of the present invention to provide an improved attachment member for such engagement with a track.

According to another aspect of the invention, therefore, we provide an attachment member for captive engagement with a track formation, the track formation being of undercut configuration in cross-section comprising an opening leading into respective laterally-outwardly-extending recesses at each side; the attachment member comprising a body, means adapted to extend through the opening of the track formation, and formations adapted to extend laterally outwardly generally in opposite directions into said recesses; said formations of the attachment member being movable in respect of their disposition and/or orientation between a first condition wherein they can be passed through said opening into the track and a second condition wherein they extend into said recesses to hold the attachment member in engagement with the track, there being provided locking means for retaining said formations in said second condition.

Preferably said formations engage each said recess at spaced positions along the track.

Said formations of the attachment member may be afforded by spaced generally T-shaped elements which have stem portions which, when the attachment member is engaged with the track, extend through the opening of the track, and transverse portions which extend laterally outwardly in opposite directions into said recesses of the track.

One of said T-shaped elements may be movable angularly about the axis of its stem portion relative to the body of the attachment member, whilst another may be movable lengthwise of its stem portion relative to the body of the attachment member.

The body of the attachment member may further comprise a guide portion which extends lengthwise of the body, for disposition within the opening of the track. Such guide portion will be generally in alignment with the stem portions of the T-shaped elements. The above described angular movement of one of the T-shaped elements about the axis of its stem portion enables it to be moved to a position in which its transverse portion is generally in alignment with the guide portion, to pass through the opening of the track, whilst a 90° movement of the T-shaped element about the axis of stem portion causes its transverse portion to extend laterally outwardly of the guide portion to enter the recesses of the track.

However if a guide portion is not provided the attachment member may be guided adequately by the T-shaped elements.

The T-shaped element which is movable lengthwise of its stem portion may be caused by such movement to assume a position in which its transverse portion is clear of the guide portion of the attachment member, so that with the attachment member as a whole extending transversely of the track the transverse portion of the T-shaped element may be passed through the opening into the track, after which movement of the attachment member through 90° or thereabouts causes the transverse portion of the T-shaped element to extend laterally into the recesses of the track. The guide portion of the attachment member can then be moved into the opening to the track, and the T-shaped element returned, by movement lengthwise of its stem portion to the position in which its transverse portion lies in the vicinity of the guide portion of the attachment member, to hold the attachment member captive to the track. Thereafter the T-shaped element which is movable angularly about the axis of its stem portion can be moved so that its transverse portion also extends into the recesses of the track.

The attachment member is then guided for movement lengthwise of the track and held captive to the track by its guide portion and by the two transverse portions of the T-shaped elements. If the attachment member were not to be required to be movable lengthwise of the track, the dimensions and/or configuration of its T-shaped elements and/or guide portion may be such that the attachment member is held stationary relative to the track.

Preferably the T-shaped elements are resiliently biased to the positions they respectively assume when the attachment member is engaged with the track as aforesaid. Suitable springs or other resilient elements may operate on the T-shaped elements in the senses in which they are movable.

Preferably the locking means cooperates with the T-shaped elements to prevent their respective angular and lengthwise movements about their stem portions. The locking means may comprise a locking member which extends from the stem portion of the angularly moveable T-shaped element and is engageable with the stem portion of the axially movable T-shaped element.

The locking member may be provided on an arm extending transversely from an end portion of the stem of the angularly movable T-shaped element, the locking member being spring-biased radially away from the stem portion to be engageable with the stem portion of the axially-movable T-shaped element. It may engage beneath a head provided at the end of the stem portion of the axially movable T-shaped element, to prevent such axial movement thereof.

Yet a further aspect of the invention is concerned with the establishment of a connection, which may be detachable, between two elements disposed in end-to-end relationship with one another, which elements each have a lengthwise extending track formation. The track formation may be engageable, by an attachment member which may be moveable along the track formation in use, for connection to a safety element, as above referred to. Preferably the elongate elements are provided as part of or in association with respective structural truss members as referred to above.

This further aspect of the present invention is particularly advantageous in the context of an attachment member for a safety line connection, to enhance the freedom of movement of a person having a safety connection with a structural member in this way by providing for movement of the attachment member from the track formation of one elongate element to the track formation of a further elongate element connected end-to-end therewith, without any requirement for disconnection and re-connection.

According to a further aspect of the invention, therefore, we provide connecting means for establishing a releasable connection between two elements disposed adjacent one another, each said element being provided with a track formation for engagement by an attachment member, the connecting means affording a track means whereby said attachment member can move between the track formations of said elements whilst remaining captive.

Preferably the connecting means comprises two connecting elements, each adapted to be secured to one of said elements which are to be connected to one another, and said connecting elements being adapted to be releasably connected to one another and to afford said track means when thus connected.

Preferably each said connecting element affords a part of said track means. The connecting elements may be identical to one another.

Preferably each connecting element comprises spaced limbs which, when two connecting elements facing in opposite directions are placed together, intercalate so that holes in the limbs register for the insertion of a fastening element such as a retaining pin or bolt, by which the connecting elements are releasably secured together.

Each connecting element may comprise a spigot for reception in an opening in one of the elements which are being connected together, whereby the connecting elements are secured to said elements which are to be releasably connected together.

According to another aspect of the invention, we provide an assembly comprising two elements releasably connected together by connecting means according to the first aspect of the invention.

Preferably the elements which are releasably connected together are elongate elements, disposed in end to end relationship with one another.

Preferably the elements which are releasably connected together are elongate elements forming part of respective structural members, each comprising a number of elongate elements disposed in spaced generally parallel relationship with one another, with transversely extending elements therebetween.

All of the elongate elements in each structural truss may have a track formation as aforesaid, or only some thereof may be thus provided.

According to another aspect of the invention, we provide a structural member comprising a number of elongate elements disposed in spaced generally parallel relationship to one another with transversely extending elements therebetween, at least one of said elongate elements being provided with a lengthwise-extending track formation for engagement by an attachment member; at least one of said elongate elements with a track formation being provided at its end with a connecting element for releasable connection to a further connecting element provided at the end of a corresponding elongate element of another structural truss disposed in end to end relationship with the first said truss, said connecting elements together defining a track means whereby said attachment member can move between the track formations of the connected elongate elements while remaining captive.

A connecting element as above set forth may be connectable, as an alternative to being connected to another connecting element, to a stop member which is adapted to block the track formation at the end of the elongate element, to prevent an attachment member engaged with the track formation from becoming disengaged from the track formation by lengthwise movement out of the end thereof.

The invention further provides, according to another aspect, a stop member engageable with a connecting element as above set forth, the stop member comprising a fixing portion adapted to be secured to the connecting element and a blocking portion adapted to block the track formation adjacent said connecting element.

The invention also provides, according to another aspect, an attachment member which is intended for connection of equipment or the like to a structural member at a fixed position without being readily movable along the track formation thereof, but which is able to be engaged with the track formation without being passed therealong from an open end.

The invention yet further provides a structural member having a further member connected thereto by an attachment member as above referred to.

BRIEF DESCRIPTION OF DRAWINGS

The invention will now be described by way of example with reference to the accompanying drawings, of which:

FIG. 2 is a transverse cross-section through one of the elongate elements utilised in the structural member;

FIGS. 3 and 4 are respectively an end elevation and side elevation of a member which may be engaged with the elongate element;

FIG. 5 is a perspective view of adjacent parts of two structural trusses connected in accordance with the invention;

FIG. 6 is a perspective view of a connecting element in accordance with the invention;

DESCRIPTION OF PREFERRED EMBODIMENTS

Figure 1:
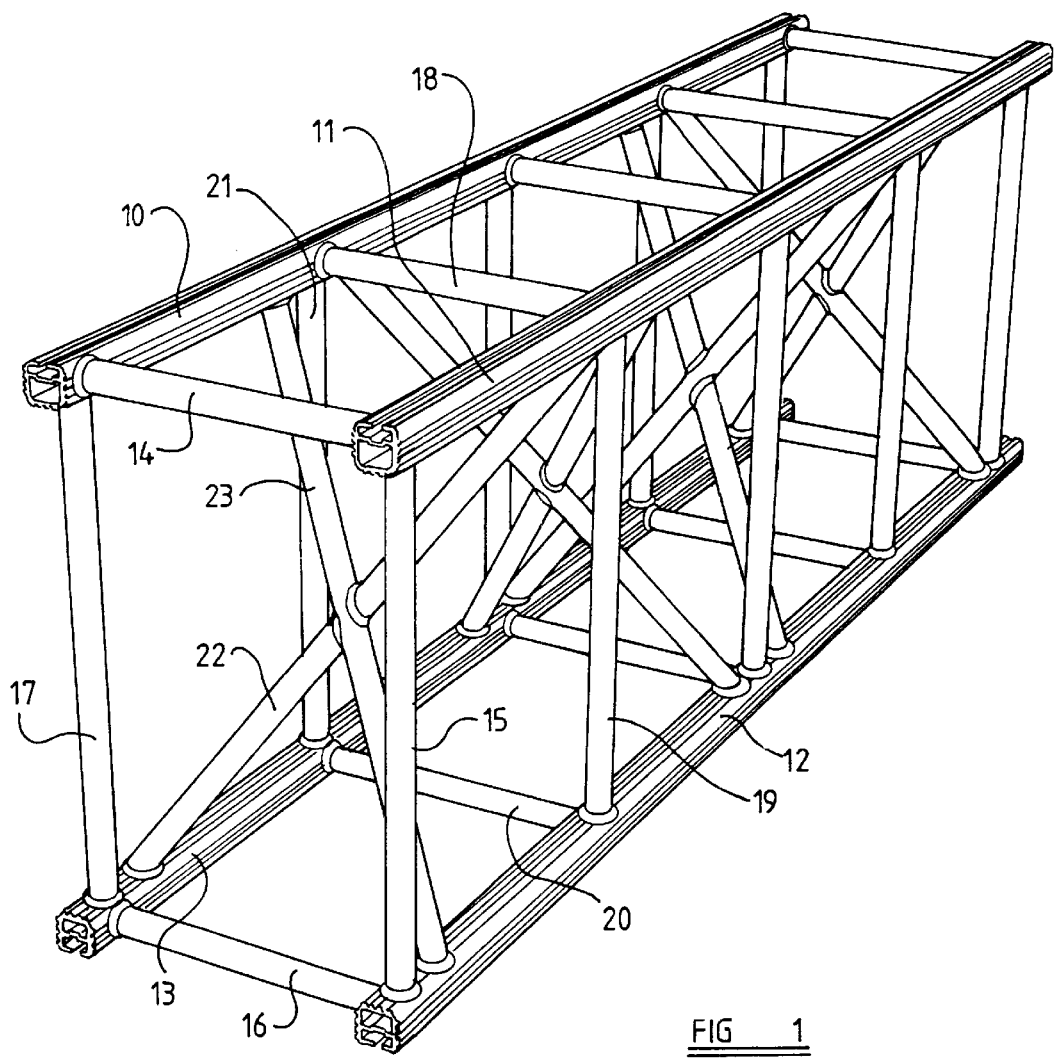
FIG. 1 is a perspective view of part of a structural member in accordance with the invention.

Referring firstly to FIG. 1 of the drawings, this shows an example of a structural member or truss in accordance with the invention. It comprises four elongate elements 10, 11, 12, 13 disposed in spaced generally parallel relationship to one another. In transverse cross-section of the structural member, the elements 10–13 are at the corners of a rectangle, but it will be appreciated that alternative structural members in accordance with the invention may be of different cross-sectional shape, e.g. a polygon such as a square or triangle or indeed some other shape. Other longitudinally extending elements may be provided if required.

The elements 10–13 are maintained in their spaced generally parallel relationship by a number of a transversely extending elements therebetween. Four elements 14, 15, 16, 17 extend perpendicularly to the elements 10–13 along the sides of the rectangle, adjacent the free ends of the elements 10–13. A further four such transverse elements 18, 19, 20, 21 extend between the elements 10–13 at a spacing therealong from the end, and further such transverse elements are provided at intervals as required along the length of the structural member. A diagonal bracing element 22 extends from the element 13 adjacent the transverse elements 16, 17 to the element 11 adjacent the transverse elements 18, 19. A further diagonal bracing element 23 extends from the element 12 adjacent the transverse elements 15, 16 to the element 10 adjacent the transverse elements 18, 21. As illustrated the element 22 is interrupted where it intersects the element 23 and is welded to the latter, but an alternative arrangement could be adopted where the elements cross one another. Further diagonal bracing elements are provided along the length of the truss.

All the above described elements may be of an aluminium alloy, e.g. extrusions of such a material, and may be secured to one another by welding. However, the members may be of other materials, e.g. steel or possibly even plastics material, may be manufactured by other production processes, e.g. by rolling or pressing from sheet material, and may be secured to one another by other means such as adhesives or fasteners such as rivets or bolts.

The cross-sectional shape of the elements 10–13 is shown in FIG. 2 of the drawings, and is described below. The cross-sectional shape of the transverse elements as 14–24 could possibly be the same, or as illustrated may be different and simpler, e.g. circular, square or rectangular, or other convenient shape.

The cross-sectional shape of the elements 10–13, clearly seen in FIG. 2, comprises a hollow generally rectangular box-section portion 28 and a portion 29 which defines an undercut generally T-section track formation 30. The portion 29 comprises side wall portions 31, 32 which extend generally parallel to one another from adjacent edges of the portion 28, the wall portions 31, 32 ending at inwardly-facing lip portions 33, 34 which extend towards one another to define an opening 115 therebetween. Oppositely outwardly extending recesses 116 are afforded beneath the lip portions 33, 34. Lengthwise external ribbing on the elements 10–13 is visible in FIGS. 2, 4 and 5, but omitted from FIG. 6 for clarity. Such external ribbing renders the element easier to grip and handle, to facilitate its use in erection of a structure.

The track formation 30 provides for engagement with the structural member, at any point along its length, by an attachment member enabling another member, component, or structure to be held to the truss. Such an attachment member may be intended to remain stationary relative to the truss, or may be for connection of a safety line, which is intended to be readily movable lengthwise of the truss so as not to inhibit the movement of a person working in the vicinity thereof.

Such a movable attachment member may, in its simplest form, be as shown in FIGS. 3 and 4, being generally T-shaped in end elevation with a head 35 to be engaged with the track formation, extending through the gap between the lip portions 33, 34 and ending in portions which extend outwardly from one another beneath the lip portions. A body 36 protrudes from the track formation and is provided with means, e.g. apertures 37, for the connection of a safety line.

A member as shown in FIGS. 3 and 4 may be engaged with an element as shown in FIG. 2 by sliding the member into the open end of the element and thereafter it may be retained therein by stop means as described hereafter. It would be possible for a structural member to be supplied with a respective slidable member in each of the elongate elements of which it is made, or in only one or some thereof. Whilst it is convenient for the structural member to be made of elongate elements which are the same cross-sectional shape as one another, such that each may be engaged by a fixed or movable attachment member, this need not be the case, only one or some of the elongate elements may be thus shaped. Further, it would be possible for an additional elongate element to be provided in the structural member, having a cross-sectional shape specifically intended to be engaged by a fixed or movable attachment member, e.g. for connection to a safety element.

Figure 7:
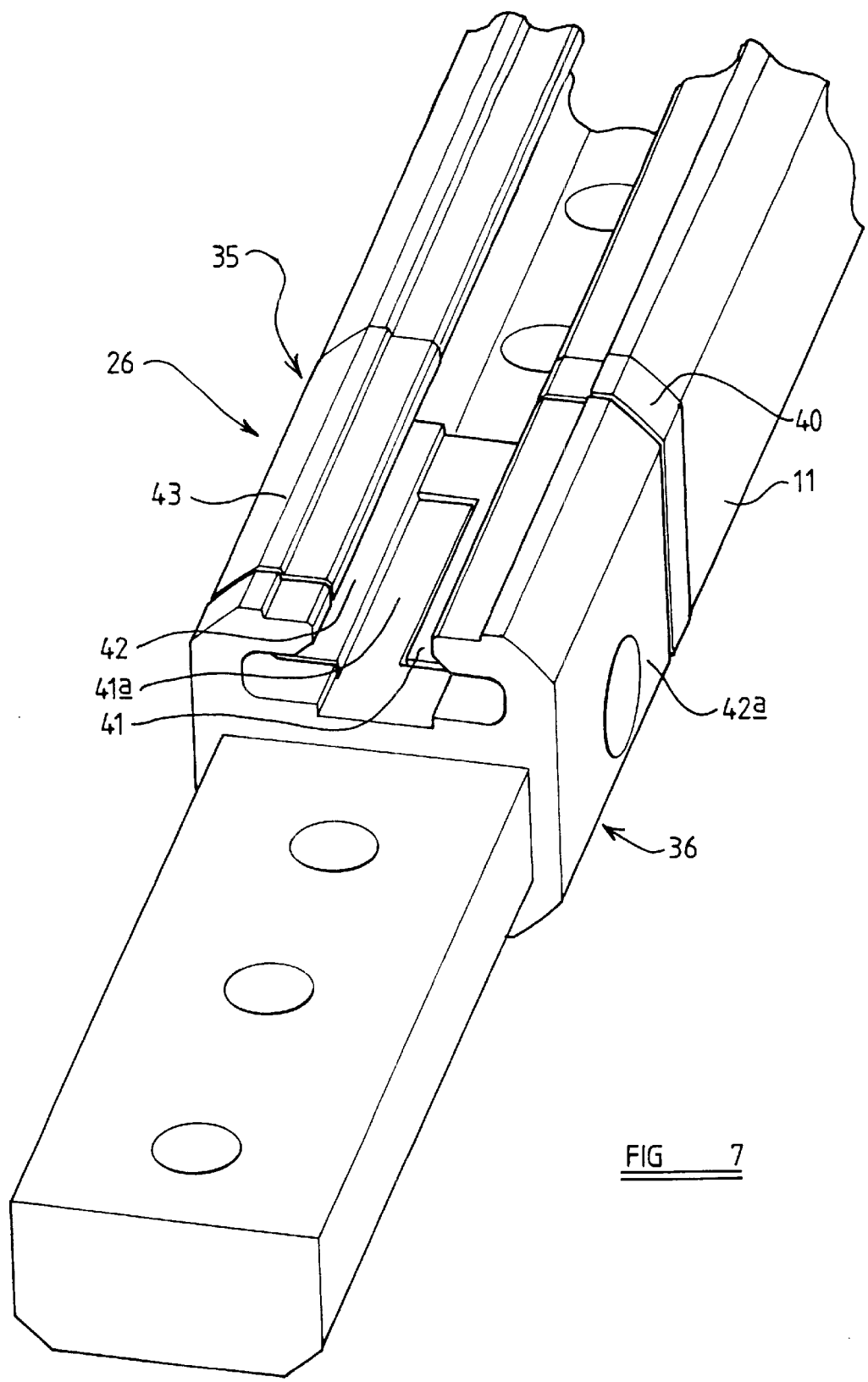
FIG. 7 is a perspective view illustrating two connecting elements in accordance with the invention, connected together.

Referring now to FIGS. 5, 6 and 7 of the drawings, these show how structural members or trusses as above described may be connected together in end-to-end relationship. FIG. 5 shows two such trusses, indicated generally at 8, 9. The truss 9 comprises the four elongate elements 10–13 as above described, whilst the truss 8 comprises corresponding elements 10a to 13a. Transverse elements extending between the elongate elements of the trusses are shown; in FIG. 5 such transverse elements are of different cross-sectional shape and arrangement from those of the truss of FIG. 1. Connecting means between the elongate elements 11, 11a is indicated at 26, and the other connecting means between each other pair of corresponding elongate elements is the same.

The connecting means 26 which connects the adjacent aligned ends of respective elongate elements of the trusses is shown in greater detail in FIGS. 6 and 7. It comprises two connecting elements which are identical to one another and which face in opposite directions: one of such connecting elements is indicated at 35 in FIGS. 6 and 7, whilst the other connecting element is shown at 36 in FIG. 7. The connecting element 35 comprises a spigot 37 which extends as a close fit into the box section portion 28 of the elongate element 23 and is secured therein for example by roll pins extending through apertures 38 in the spigot portion 37 and through aligned apertures drilled in the box-section portion of the elongate element 23. The spigot 37 ends in a flange formation 39 which abuts the end face of the elongate element 23 and it will be noted that the flange formation includes a portion 40 which is of similar shape to, and forms a continuation of, the wall portion 32 and lip portion 34 which partially define the track 30 in the elongate element 23. From the flange 39 two spaced parallel limbs 41, 42 extend forwardly, and these limbs are offset from the centre line of the connecting element with the limb 42 having a portion 43 which forms a continuation of the wall portion 31 and lip portion 33 of the elongate element 23 which partially define the track 30 therein. The limbs 41, 42 have aligned apertures 44, 45 extending transversely through them.

The above-described configuration of the connecting element 35 is such that another such connecting element 36 facing in the opposite direction to the connecting element 35 is able to interfit therewith as shown in FIG. 3. The limbs as 41, 42 of the two connectors intercalate, with the limb (indicated at 41a in FIG. 7) of the connector 36 fitting closely between the limbs 41, 42 of the connector 35.

Similarly the limb 41 of the connecting element 35 fits closely between the limb 41a of the connecting element 36 and the limb (42a) of the latter connector corresponding to the limb 42 of connector 35. When thus fitted together, the apertures as 44, 45 of both the connecting elements are in alignment with one another, enabling the connecting elements to be releasably secured to one another by passing a securing pin, e.g. with a retaining clip, or securing bolt through the aligned apertures. Thus a releasable connection between the elongate elements and the trusses of which they form a part is achieved.

When connected together as above described, the connecting elements further provide a track portion in continuation of the track formations in the elongate elements, enabling an attachment member for a safety line to pass between the track formations of the two elongate elements while remaining captive. Thus when two trusses are connected together, a worker working thereon and making use of such a safety line does not necessarily have to disconnect the safety line from one truss and reconnect to the other: the attachment member can pass freely between the trusses. Thereby the freedom of working of the worker is not unduly inhibited so he is more likely to make correct use of a safety line.

If instead of a movable attachment member for engagement of a safety line an attachment member intended for fixed mounting of something else to a truss is engaged with the track formation in an elongate element of a truss, the invention enables such an attachment member to be moved freely between trusses prior to being fixed.

Figure 8:
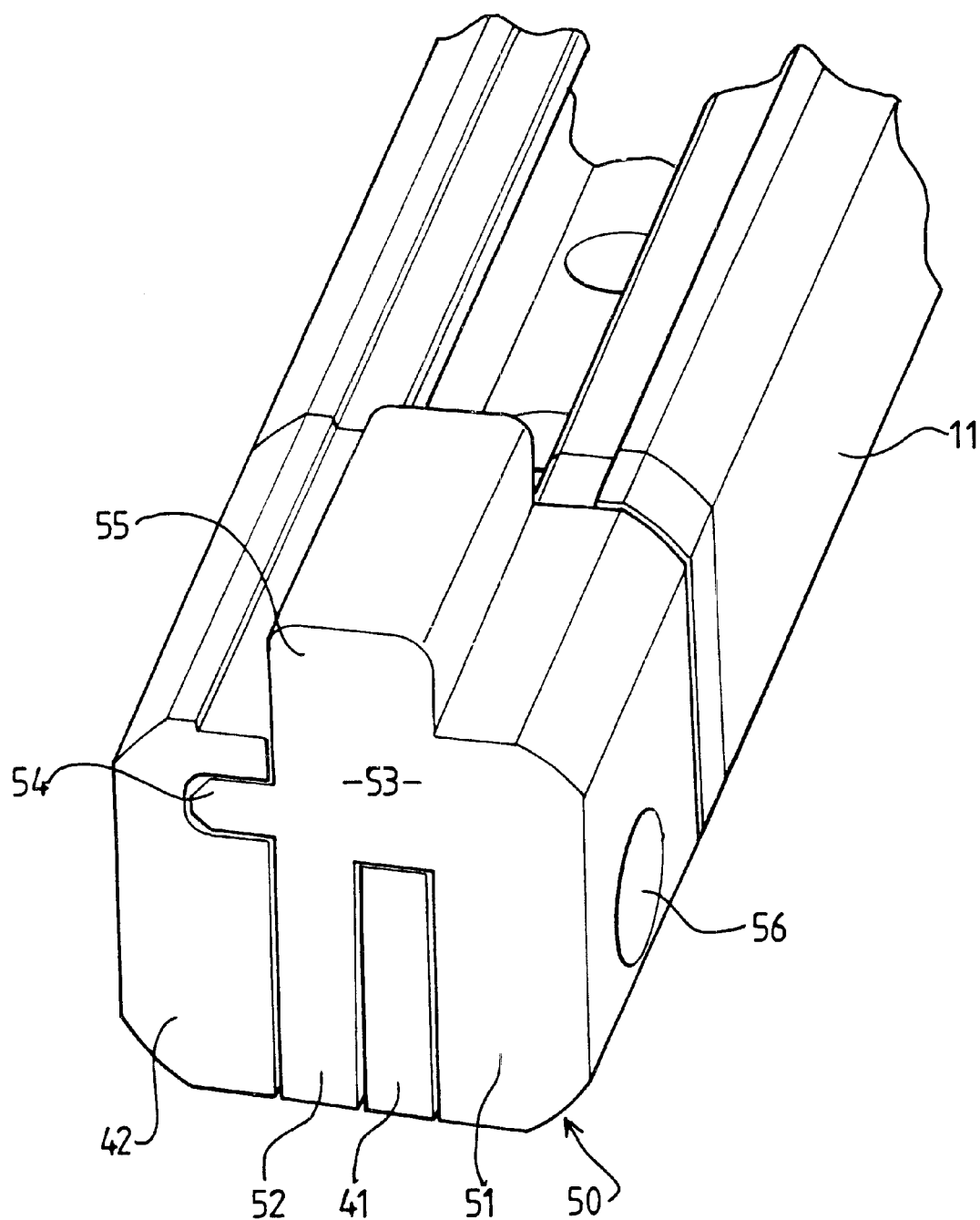
FIG. 8 is a perspective view illustrating a stop member connected to a connecting element in accordance with the invention.

Referring now to FIG. 8 of the drawings, this shows a stop member engaged with the connecting element 35. The stop member, indicated generally at 50, has a fixing portion comprising two spaced parallel limbs 51, 52 which intercalate with the limbs 41, 42 of the connecting element. A blocking portion 53 of the stop element blocks the track formation 30 at the end of the elongate element 11, with a portion 54 which engages beneath the portion 43 of the connecting element and a portion 55 which upstands above and blocks the opening 115 which leads into the track formation. The portion 53 of the stop member also aligns with the portion 40 of the connecting element and blocks the recess part 116 of the track formation therebeneath.

The stop member may be secured to the connecting element by a securing pin or bolt passed through aligned apertures at 56 in the stop member and connecting member, in analogous manner to the way above described in which two connecting members are secured together. When thus fitted to a connecting member, the stop member prevents an attachment member engaged with the track formation 30 from being disengaged therefrom by lengthwise movement out of the end thereof.

Figure 9:
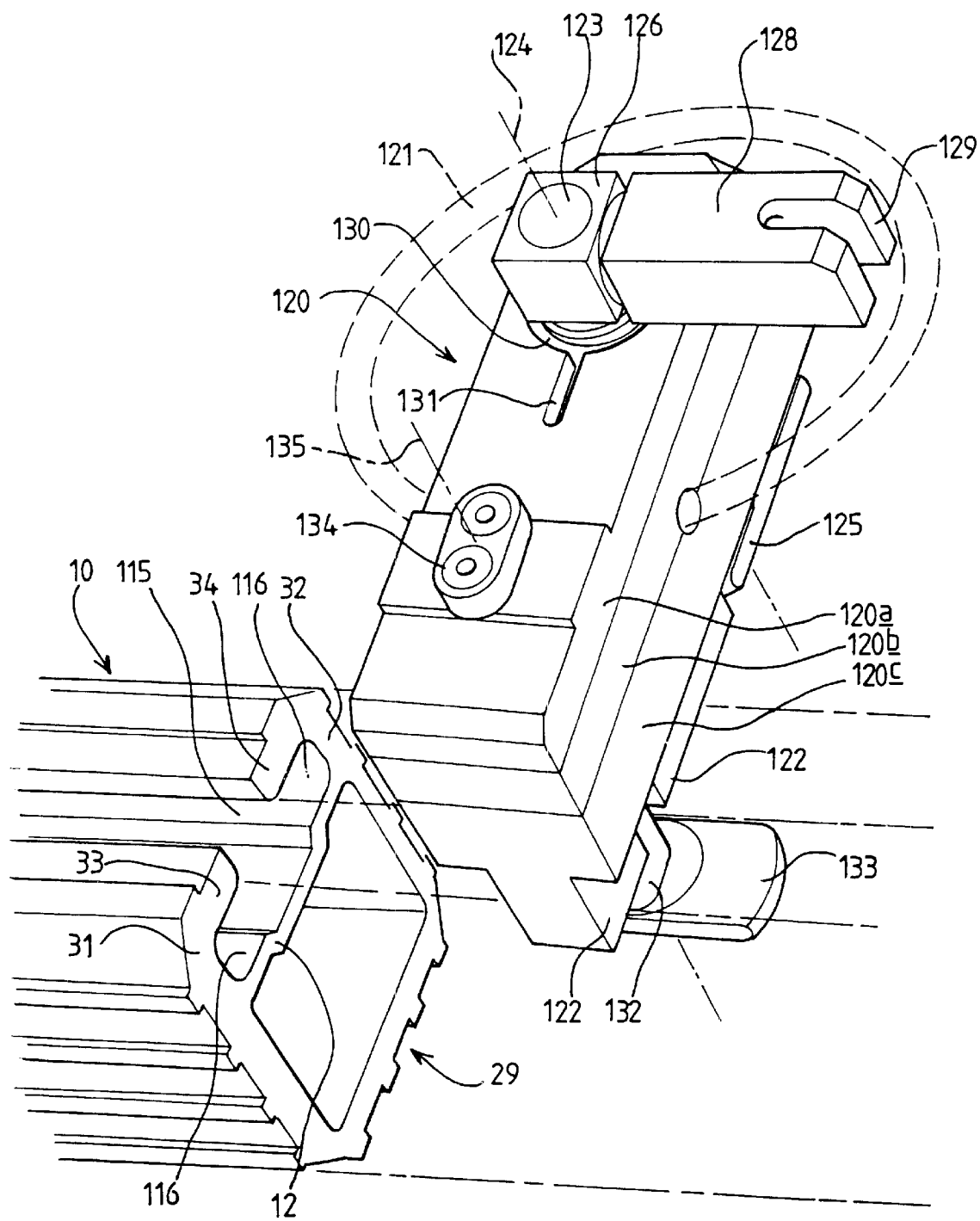
FIG. 9 is a perspective view showing an attachment member in accordance with the invention, in a mounting/dismounting condition in relation to an elongate track member.
Figure 10:
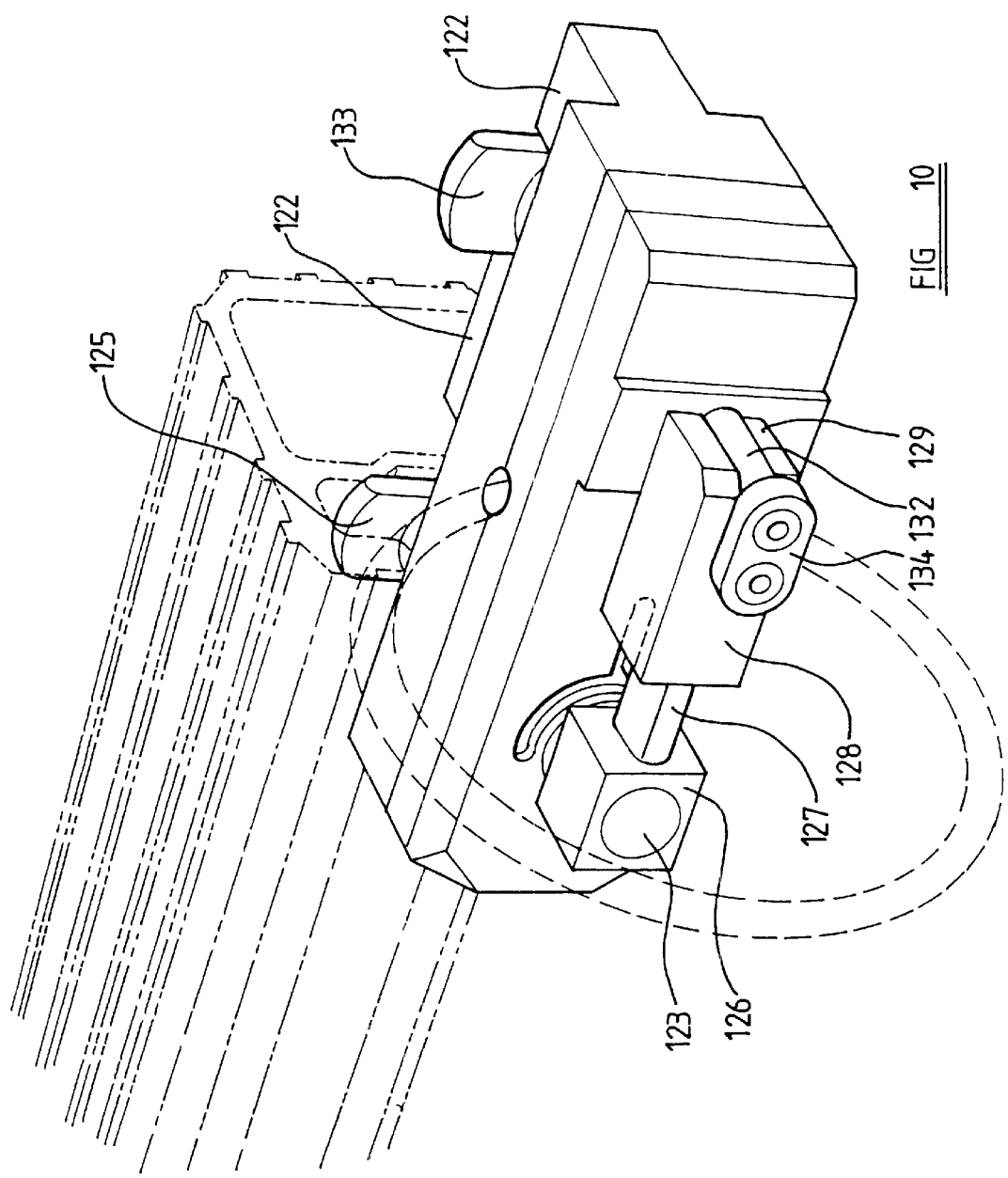
FIG. 10 is a perspective view showing the condition of the attachment member when engaged with the track member.

Referring now to FIGS. 9 and 10 of the drawings, these show an embodiment of an attachment member intended for movement along the track formation of an elongate element of a truss as above described, while remaining captive thereto for engagement by a safety line. Further, it is able to be engaged with and disengaged from the track formation at a mid-position along the length thereof, not requiring to be engaged or disengaged at an end of the track formation.

FIG. 9 shows an elongate element as one of the elongate elements 10–13 above described, and in FIG. 9 this element is indicated at 10. Its shape is as above described, and the track formation afforded thereby is generally T-shaped in cross-section with an opening 115 defined between the inturned lips 33, 34 leading to oppositely outwardly extending recesses 116 beneath the inturned lips.

An attachment member engageable with the track comprises a body indicated generally at 120. The body, may be in one piece or, as illustrated, may be of laminated construction comprising a number of body parts indicated at 120a, 120b, 120c disposed upon one another and secured together by any convenient means (not shown). Such construction enables the provision of internal cavities in the body for the reception of springs and the like for the purposes described hereafter, and for an attachment ring 121 for connection of a security line to be held captive to the body. The part 120c of the body 120 includes a guide portion 122 which when the attachment member is engaged with the track lies in the opening 115 between the free ends of the lips 114. The body may be of metal, e.g. aluminium alloy, or/and may be of a suitable plastics material.

Movably mounted relative to the body there are two generally T-shaped elements, one adjacent each end of the body. The first of such T-shaped elements comprises a stem 123 which is received in the body for angular movement about its axis 24, and a transverse portion 125 at one end of the stem. The angular movement provides for the transverse portion 125 to be moved between the position in which it is shown in FIG. 9 in which it lies in alignment with the guide portion 122 and the position in which it is shown in FIG. 10 in which it extends transversely outwardly relative to the guide portion 122, to lie within the recesses 16 of the track when the attachment member is engaged with the track. Spring biasing means (not shown) preferably biases it to the latter position. Above the body 120 the stem 123 has secured to it a boss 126 from which an arm 127 extends radially outwardly relative to the axis 124. The arm 127 carries a locking member 128 which is spring biased away from the boss 126, the end of the locking member 128 being forked at 129. Beneath the locking member 128 there is a projection, e.g. a pin (not shown), which engages with a groove in the upper surface of the body 120, the groove comprising an arcuate portion 130 concentric with the axis 124 and a straight portion 131 extending therefrom towards the opposite end of the body 120. This means that the locking member 128 is only able to move away from the boss 126 when it is facing the opposite end of the body 120 and the transverse portion 125 extends laterally outwardly relative to the guide portion 122. Conversely the T-shaped element is only able to be moved angularly about the axis 124 after the locking member 128 has been moved towards the boss 126 against the action of its biasing spring.

The other T-shaped element comprises a stem 132 and a transverse portion 133 at one end thereof. The other end of the stem 132 has a head 134 secured thereto, and angular movement of the stem and transverse member 133 about the axis 35 of the stem is prevented from taking place for example by the stem being of non-circular cross-sectional shape (e.g. oval as illustrated), by interengaging formations on the stem and body, or otherwise. The T-shaped element is, however, movable lengthwise of the axis of the stem, and is spring biased to the position in which it is shown in FIG. 10, with the head 134 spaced from the upper surface of the body 120 of the attachment element and the transverse portion 133 generally in line with the lower surface of the guide portion 122 of the attachment element. The T-shaped element is movable to the position shown in FIG. 9, in which the transverse portion 133 is clear of the guide portion 122, by pressing on the head 134.

To engage the attachment member with the track at a mid-position of the track, the attachment member is held in the orientation relative to the track in which it is depicted in FIG. 9, and the head 134 depressed so that the transverse portion 133 is clear of the guide portion 122. This enables the transverse portion to be passed through the opening 115 of the track, after which the attachment member can be moved bodily through about 90° so that the transverse portion 133 extends outwardly in opposite directions into the recesses 116 of the track. The guide portion 122 of the attachment member can enter the opening 115, and as it does so the transverse portion 133 is returned, under the influence of its spring biasing, to the position in which it is shown in FIG. 10.

When the guide portion 122 of the attachment member lies in the opening 115 of the track, the transverse portion 125 of the other T-shaped element is in alignment with the recesses 116 of the track. This T-shaped element can then be moved angularly about the axis 124 of its stem 123 so that the transverse portion 125 enters the recesses 116 of the track, such movement being effected by pressing on the locking member 128 possibly assisted by any spring-biasing means provided in association with this T-shaped element. When the locking member 128 is in the position extending towards the opposite end of the body 120, corresponding to the disposition of the transverse portion 125 substantially perpendicular to the length of the body 120, the pin beneath the locking member 128 is able to enter the straight portion 131 of the groove in the upper surface of the body 120 and the locking member 128 move under the action of its biasing spring away from the boss 126 so that its forked end 129 embraces the stem 132 beneath the head 134. When this position has been assumed, it will be appreciated that the cooperation of the locking member 128 with the stem 134 of the other T-shaped element requires a sequence of operations which is the reverse of the above described sequence to be performed before the attachment member can be disengaged from the track. Such a sequence is most unlikely to be carried out unintentionally.

Figure 11:
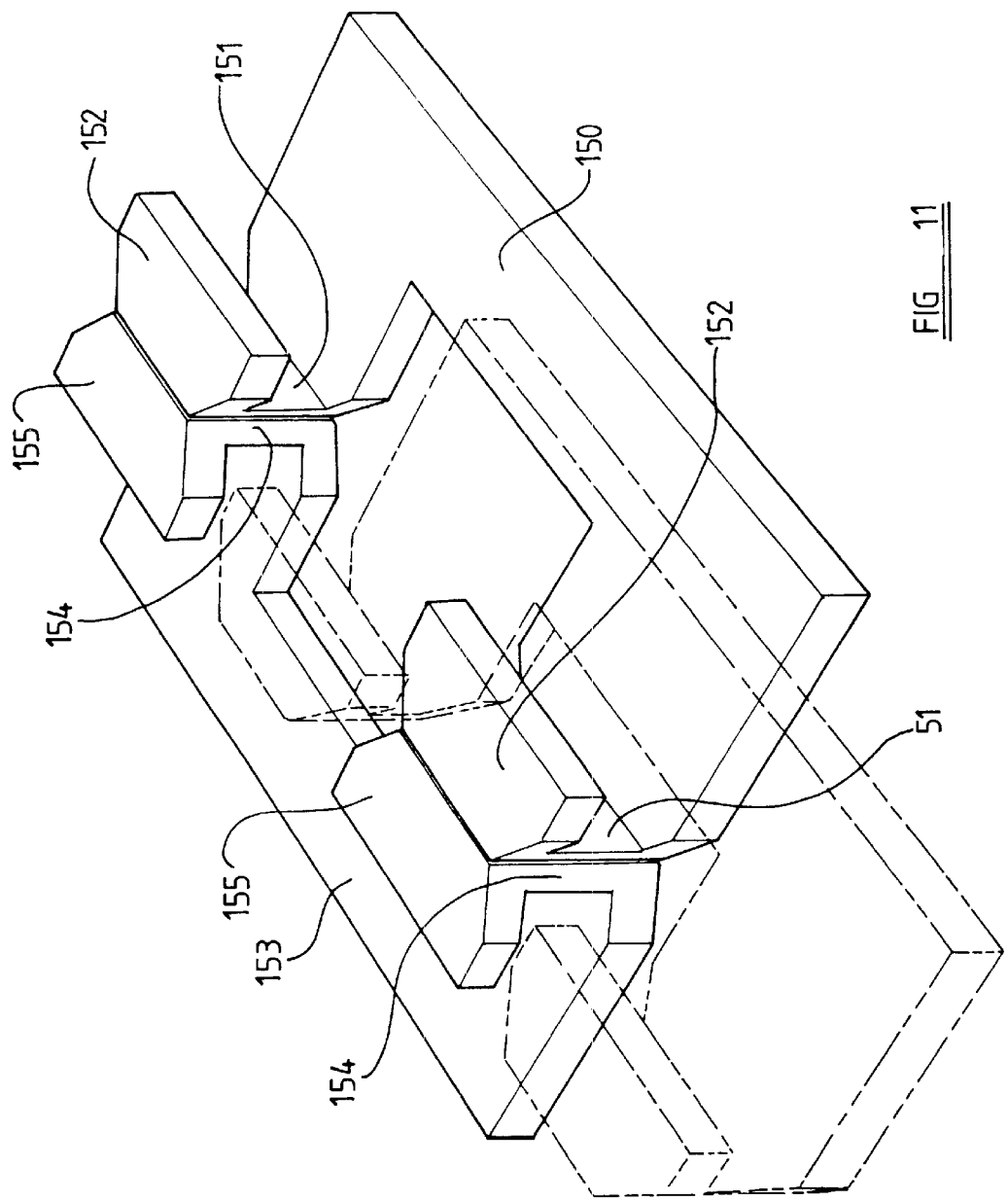
FIG. 11 is a perspective view illustrating a further possible arrangement of track-engaging formations of the attachment member.

Referring now to FIG. 11 of the drawings, this illustrates diagrammatically another way in which track-engaging formations of an attachment member can be arranged. FIG. 11 shows a first element 150 having upstanding portions 151 with track-engaging formations 152 thereon. A further element 153 has upstanding wall portions 154 with track engaging formations 155 thereon. They are shown in full lines in FIG. 11 in a position assumed when they are engaged with a track, with the upstanding wall portions 151, 154 in back to back relationship to extend through the opening of a track as previously described, and the formations 152, 155 extending away from one another to enter the recesses beyond the opening of the track.

The elements 150, 153 are supported by a body of an attachment member in such a way that they are able to move longitudinally of the track relative to one another and also transversely of the track so that they are able to assume an alternative relative position in which the element 150 and its associated parts is shown in broken lines in FIG. 11. In this relative position the formations 152, 155 are in alignment with one another in the longitudinal direction so that they can pass through the opening of the track. Then return of the elements 153, 150 to the relative position first described causes the formations 152, 155 to engage the track in such a way that they cannot be removed therefrom. In the drawing, end faces of the formations 152, 155 and the associated upstanding walls 151, 154 are shown as inclined cam surfaces which may cooperate in the course of such relative movement of the elements. Any suitable locking means operative between the elements 150, 153 and the body of the attachment member will be provided for ensuring that the condition of secure engagement of the track is retained until disengagement from the track is required.

Figure 12:
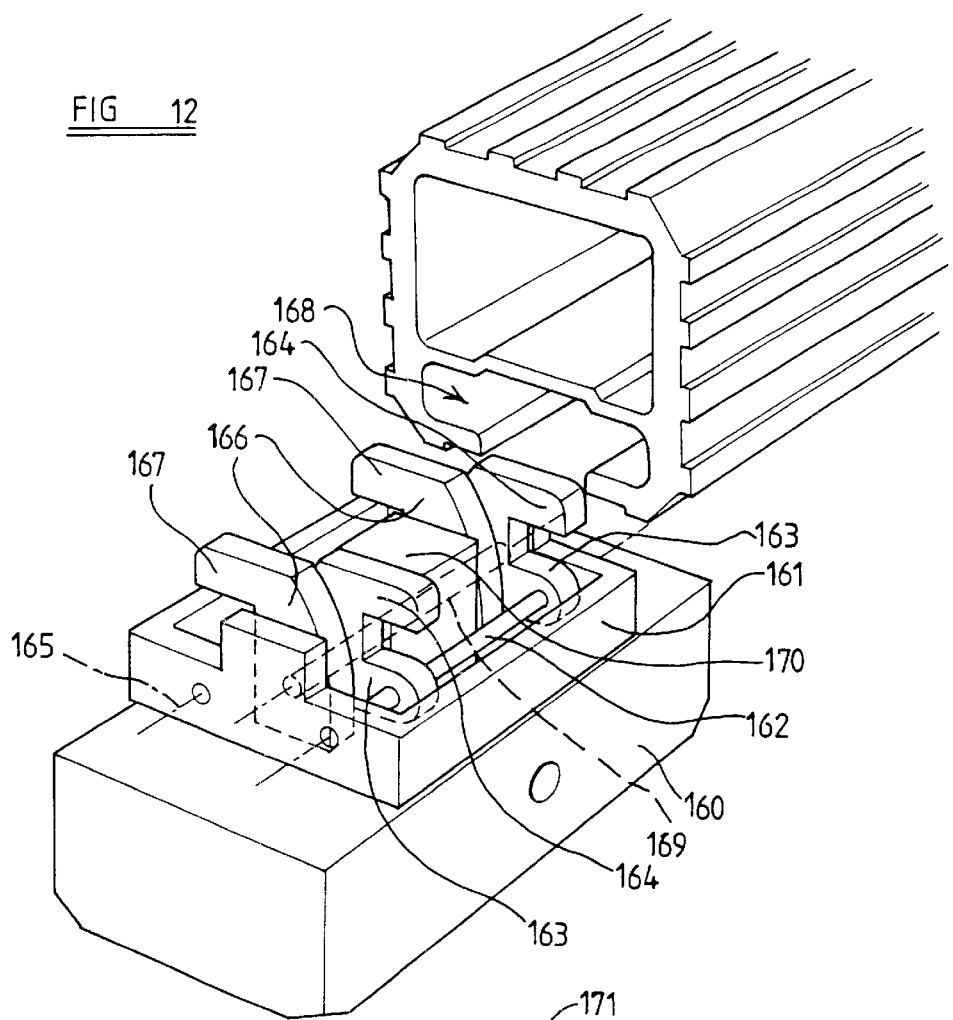
FIGS. 12 and 13 illustrate diagrammatically yet a further possible arrangement of track-engaging formations of the attachment member.
Figure 13:
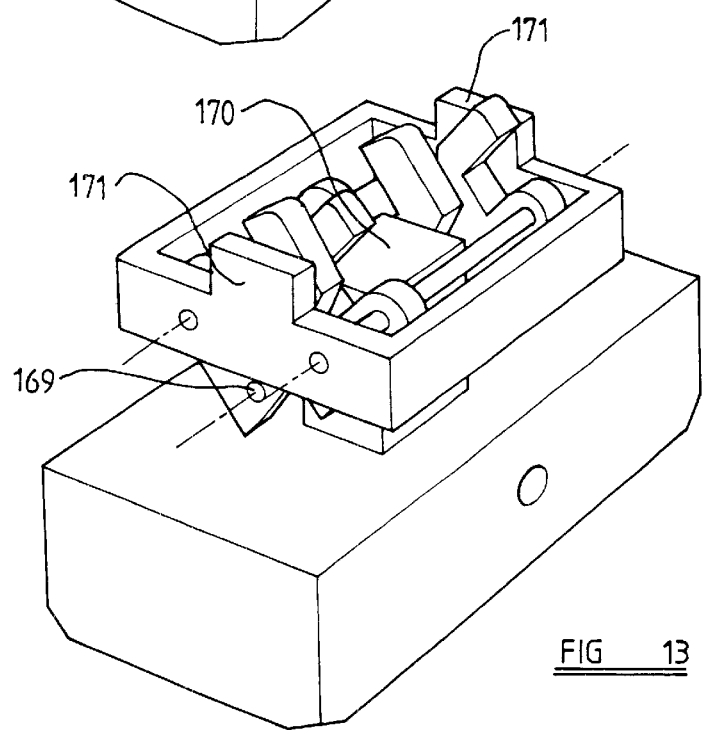

Referring now to FIGS. 12 and 13 of the drawings, these show yet another embodiment which includes a body 160 above which is shown a support member 161. The support member 161 carries, for pivotal movement about a spindle 162, two spaced track-engaging elements 163 with respective engaging formations 164. The member 161 further carries, for pivotal movement about a spindle (not shown) but whose axis is indicated at 165 parallel to the spindle 162, two spaced track-engaging elements 166 with engaging formation 167. The formations 167 face in the opposite direction to the formations 164, transversely of a track part of which is indicated at 168.

All the elements 163, 166 are pivotably engaged with a further spindle 169 which extends parallel to the aforementioned spindles and is carried by a portion 170 upstanding from the body 160. The result of such engagement is that a movement of the body 160 away from the member 161 to the position illustrated in FIG. 13 effects a pivotal movement of the elements 163, 166 to a retracted position shown in FIG. 13 in which their formations 164, 167 are able to pass through the opening of the track 168. It will of course be appreciated that some lost motion has to be provided in the connection between the elements 163, 166, 170 and the spindle 169 to accommodate the respective different arcuate paths of movement of the parts of the elements which cooperate with the spindle.

When in the condition shown in FIG. 12 the formations 164, 167 extend into the recesses of the track 168 to retain the attachment member to the track and guide it for movement there along. Guide formations are shown at 171 on the member 161, for cooperation with the boundaries of the opening of the track. Suitable locking means operative between the body 160 and member 161 would be provided for holding them in the position shown in FIG. 12, release of such locking means enabling them to be moved to a position shown in FIG. 13 for engagement with the track or release therefrom as may be required.

Figure 14:
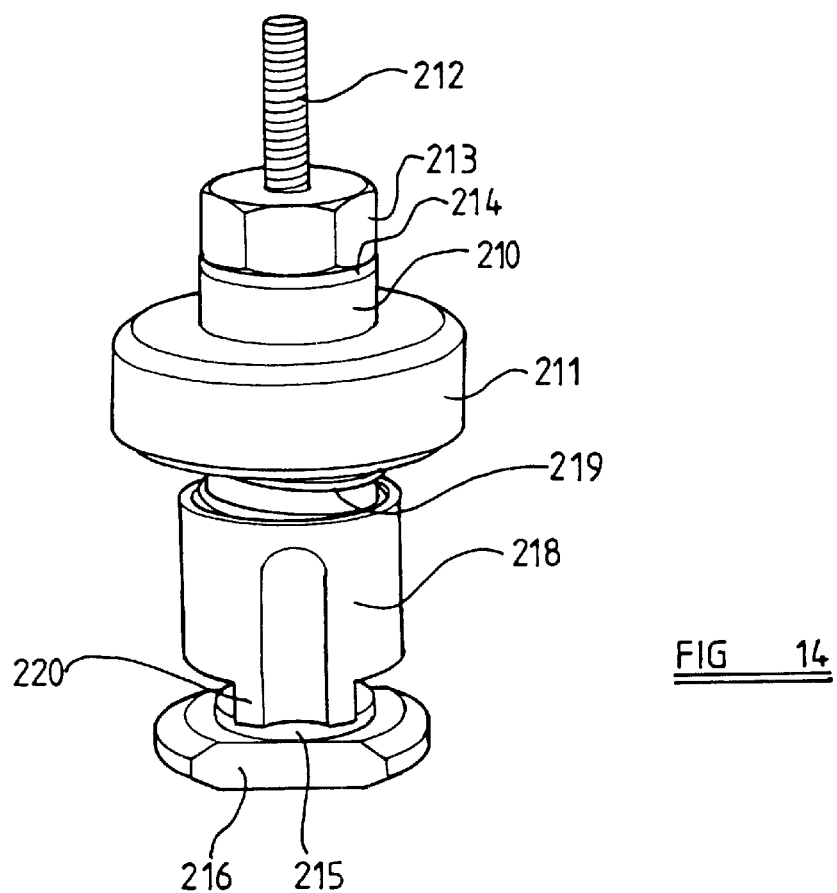
FIG. 14 is a perspective view of an attachment member engageable with a track formation of an elongate element.

Referring now to FIG. 14 of the drawings, this shows, in a perspective view, an attachment member engageable with the track formation of an elongate element of a truss as above described, intended for the support of some other item, e.g. lighting or sound equipment, relative to the truss. It is intended, when engaged at a required position, to remain in such position.

The attachment member comprises a body indicated generally at 210 and comprising a circular flange portion 211 whose periphery is knurled to render it easily graspable. Above the flange portion 211 there is a screw-threaded spigot 212 with which there is shown engaged a nut 213 and washer 214, so that the other item or equipment as above referred to may be secured to the attachment member.

On the opposite side of the flange to the spigot, there extends a stem 215 which ends at a transverse portion 216 whose width is slightly less than the opening 115 of the track formation and whose length is sufficient, when the portion 216 is in an appropriate orientation, to extend into the recesses 116 of the track formation. Between the transverse portion 216 and the flange, the stem 215 receives a collar 218 which is spring biased towards the transverse portion 216 by a compression spring 219. Facing the transverse portion 216, the collar has a dog formation 220 whose width is such as to fit closely in the opening 115 between the inturned lips of the elongate element.

The above described construction of the attachment element enables it to be held and the transverse portion passed through the opening 115 of the track formation. When the collar 218 abuts the elongate element, it can be pressed towards the flange 211 against the force of its biasing spring. The attachment member can then be moved through 90° about the longitudinal axis of its body, stem and spigot to orient the transverse portion transversely of the track formation of the elongate element with the ends of the transverse portion lying in the recesses 116 of the track. When suitably oriented, the collar 218, which is not able to move angularly about the axis of the stem, can move towards the transverse portion under the action of the spring so that the dog formation 220 lies between the edges of the inturned lips forming the opening 115. The attachment member is then incapable of any further such angular movement, so it remains firmly captive in engagement with the track formation.

When the attachment member is required to be disengaged from the track formation, the collar 218 can be manually pulled towards the flange against the action of its biasing spring, and when the dog formation 220 is clear of the opening 115 the attachment member can be moved angularly until the transverse portion can be removed through the opening 115.

Figure 15:
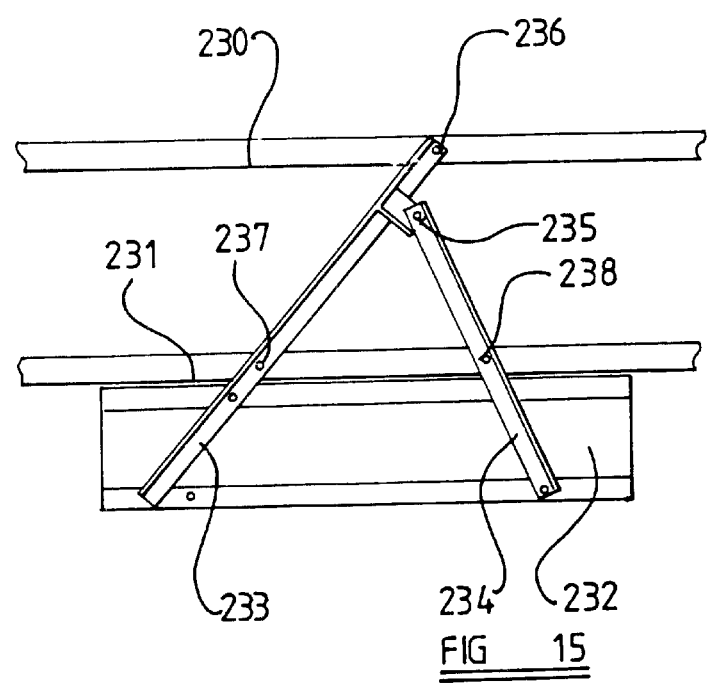
FIG. 15 is an underneath view showing how attachment members as FIG. 14 can be used to secure a working platform to a structural member.

FIG. 15 shows diagrammatically how attachment members as shown in FIG. 14 may be used to secure another item of equipment to a truss. In this case, the further item of equipment is a ledge on which a person working at the truss may stand. FIG. 15 shows two parallel elongate members 230, 231 of a truss, namely the two lower, laterally spaced, elements of an installed truss. A sheet-metal, of appropriately pressed section to give it the required strength and rigidity, ledge 232 is connected to two support members 233, 234 which are angle-section pressings or extrusions for example. The members 233, 234 are connected to one another by an e.g. bolted connection at 235 and to the elongate elements 230, 231 at 236, 237, 238. Attachment members as above described with reference to FIG. 14 are used at the points 236, 237, 238 to provide a secure, but readily attachable and detachable when required, connection to the truss.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A structural member having a first end and a second end and comprising:
    at least three spaced apart elongate elements extending between the first end and the second end, each of the elongate elements disposed generally parallel relationship to each other;
    a plurality of interconnecting elements extending between the elongate elements, the interconnecting elements maintaining the elongate elements in the generally parallel relationship;
    at least one of the elongate elements comprising a track formation extending between the first end and the second end, the track formation being unobstructed by any of the interconnecting elements, the track formation adapted to receive therein an attachment member such that the attachment member may engage the track formation at any position along the at least one elongate element between the first end and the second end.

2. The structural member of claim 1, wherein the track formation comprises a generally T-shaped cross section.

3. The structural member of claim 1, in combination with the attachment member, the attachment member including at least a pair of side formations sized and shaped to be slidably received in the track formation to thereby enable the attachment member to be slidably and captivity engaged in the track formation.

4. A structural member according to claim 1 wherein all of the elongate elements include the track formation.

5. A structural member according to claim 1 wherein said track formation is of undercut configuration in transverse cross-section and includes a pair of laterally outwardly extending recesses.

6. A structural member according to claim 5 comprising at least one attachment member in captive engagement with the track formation.

7. A structural member according to claim 6 wherein the attachment member is freely movable along the track formation.

8. A structural member according to claim 7 wherein the track formation includes an opening leading into the laterally outwardly extending recesses, the attachment member comprising a body, a member adapted to extend through the opening of the track formation, and formations adapted to extend laterally outwardly generally in opposite directions into said recesses, said formations of the attachment member being movable in respect of at least one of their disposition and orientation between a first condition wherein the formations can be passed through said opening into the track formation and a second condition wherein the formations extend into said recesses to hold the attachment member in engagement with the track formation, said formations being lockable to retain them in said second condition.

9. A structural member according to claim 8 wherein said formations of the attachment member are spaced apart so as to engage said recess at spaced positions along the track formation.

10. A structural member according to claim 9 wherein said formations comprise first and second generally T-shaped elements, each of the T-shaped elements having a stem which extends through the opening of the track formation into the track formations, each of the first and second T-shaped elements further including transverse portions which extend laterally outwardly in opposite directions into said recesses of the track formation.

11. A structural member according to claim 10 wherein one of said T-shaped elements is movable angularly about an axis of its stem portion relative to the body of the attachment member.

12. A structural member according to claim 11 wherein another one of said T-shaped elements is movable lengthwise of the axis of its stem portion relative to the body of the attachment member.

13. A structural member according to claim 12 wherein the body of the attachment member comprises a guide portion extending lengthwise of the body, the guide portion for disposition in the opening of the track formation.

14. A structural member according to claim 13 wherein said angular movement of the first T-shaped element causes its transverse portions to be moved between a first position in which the transverse portions of the first T-shaped element are generally aligned with said guide portion and in which the transverse portions o the fist T-shaped element extend laterally outwardly of the guide portion, and wherein said movement of the second T-shaped element lengthwise of its stem portion enables the second T-shaped element to assume a position in which the transverse portions are clear of said guide portion of the attachment member.

15. A structural member according to claim 12 wherein said T-shaped elements are lockable to prevent their respective movements about the axes of their stem portions.

16. A structural member according to claim 15 comprising a locking member extending from the stem portion of the first T-shaped element and engageable with the stem portion of the second T-shaped element.

17. An assembly comprising two elongate elements disposed in end-to-end relationship with one another, each said elongate element comprising part of a respective structural members, each of the structural members comprising a number of elongate elements disposed in spaced apart a generally parallel relationship and having a plurality of interconnecting members extending therebetween, each of the elongate elements being provided with a length-wise extending track formation for engagement by an attachment member, and a connection providing a releasable connection between said two elongate elements, wherein said connection affords a connecting track portion whereby the attachment member can move between the track of said elongate elements while remaining captive.

18. An assembly comprising:
a first elongate element having a first end and a track formation extending lengthwise along the first elongate element to the first end;
a second elongate element having a second end and a track formation extending lengthwise along the second elongate element to the second end;
the first and second elongate elements disposed in end-to-end relationship with the first end adjacent the second end and with the track formation of the first elongate element aligned with the track formation of the second elongate element;
a first connecting element secured to the first end;
a second connecting element secured to the second end;
the first and second connecting elements cooperating to define a track portion, the track portion extending between the track formations of the first and second elongate elements; and
a releasable connection between the first connecting element and the second connecting element.

19. An assembly comprising:
a first elongate element having a first end and a track formation extending lengthwise along the first elongate element to the first end;
a second elongate element having a second end and a track formation extending lengthwise along the first elongate element to the second end;
the first and second elongate elements disposed in end-to-end relationship with the first end adjacent the second end and with the track formation of the first and second elongate elements in alignment;
a first connecting element secured to the first end;
a second connecting element secured to the second end;
a releasable connection between the first and second connecting elements;
the first and second connecting elements being substantially identical, each of the first and second elements defining a first part and a second part, respectively, the first and second parts cooperating to define a connecting track portion extending between the track formations of the first and second elongate elements.

20. An assembly comprising:
a first elongate element having a first end and a track formation extending lengthwise along the first elongate element to the first end;
a second elongate element having a second end and a track formation extending lengthwise along the first elongate element to the second end;
the first and second elongate elements disposed in end-to-end relationship with the first end adjacent the second end and with the track formation of the first and second elongate elements in alignment;
a first connecting element secured to the first end;
a second connecting element secured to the second end;
a releasable connection between the first and second connecting elements whereby the first and second elements are connected together;
the first and second connecting elements substantially identical to each other and comprising spaced limbs, the spaced limbs of the first and second connecting elements intercalating, each of the first and second connecting elements forming a part of a connecting track portion;
the parts of the first and second elements when assembled defining the connecting track portion, the connecting track portion extending between the track formations of the first and second elongate elements.

21. A structural member comprising:
a first truss and a second truss, each truss having a first end, a second end, and having a plurality of spaced apart elongate elements extending between the first end and the second end, the trusses arranged to be joined in end-to-end relationship;
each of the trusses including a plurality of interconnecting braces extending between the elongate elements, the braces maintaining the elongate elements in generally fixed relationship to each other;
at least one of the elongate elements on each of the trusses having a cross-section defined at least in part by a first portion and a second portion, the first portion defining a generally enclosed box-section, the second portion shaped to provide a track extending continuously and without interruption and obstruction between the first end and the second end of the truss, the trusses arranged so that the track of each truss is aligned with the track of the other truss; and
a connection joining the aligned tracks, the connection including a first part and a second part, the first part engaging the box-section of the first truss and the second part engaging the box-section of the second truss, the first part and the second part cooperating to define a connecting track extending between the aligned tracks.

* * * * *